(12) United States Patent
Lower

(10) Patent No.: US 6,298,535 B1
(45) Date of Patent: Oct. 9, 2001

(54) WHEEL LIFTING ROD ASSEMBLY

(76) Inventor: William Ross Lower, 5535 Bluff St., Norco, CA (US) 92860-2421

( * ) Notice: Subject to any disclaimer, the term of this patent is extended or adjusted under 35 U.S.C. 154(b) by 0 days.

(21) Appl. No.: 09/505,348

(22) Filed: Feb. 16, 2000

(51) Int. Cl.⁷ .................................................. B25B 27/14
(52) U.S. Cl. ............................................. 29/273; 254/131
(58) Field of Search .................... 29/273, 271; 81/177 B, 81/15.2; 7/100, 138, 166; 254/100, 120, 131; 157/1.1, 1.11; D8/14

(56) References Cited

U.S. PATENT DOCUMENTS

| | | |
|---|---|---|
| D. 343,997 | 2/1994 | Smith . |
| D. 347,981 | 6/1994 | Suggs, Sr. . |
| D. 412,271 | 7/1999 | Kliskey . |
| 1,494,269 | 5/1924 | Meyers . |
| 1,999,206 | 4/1935 | Patterson . |
| 2,555,698 * | 6/1951 | Masheck ................................ 29/273 |
| 2,770,873 | 11/1956 | Ramsey . |
| 3,389,453 | 6/1968 | Tarter et al. . |
| 4,097,979 | 7/1978 | Interdonato . |
| 4,602,415 | 7/1986 | Garcia . |
| 4,949,488 | 8/1990 | Hebnes . |
| 5,022,133 | 6/1991 | Weitekamp . |
| 5,180,141 * | 1/1993 | Hunt ..................................... 254/131 |
| 5,479,692 | 1/1996 | Barkus . |
| 5,547,190 * | 8/1996 | Mackewich .......................... 273/84 R |
| 5,568,956 | 10/1996 | Benefield . |
| 5,581,866 | 12/1996 | Barkus . |
| 5,888,137 * | 3/1999 | Bulke .................................. 463/47.2 |
| 5,897,171 | 4/1999 | Seifert . |

FOREIGN PATENT DOCUMENTS

PCT/US94/
12173   5/1995  (WO) .

* cited by examiner

Primary Examiner—Joseph J. Hail, III
Assistant Examiner—Daniel Shanley
(74) Attorney, Agent, or Firm—Gene Scott-Patent Law & Venture Group

(57) ABSTRACT

An apparatus comprises a pair of smooth linear rods, each of the rods providing a first rod end and a second rod end, the first rod end of each of the rods having a first blind bore therein, and the second rod end of each of the rods having a second blind bore therein. A coiled spring is integrally engaged between the dual linear rods. The coiled spring provides a pair of opposing terminal spring ends, one of each of the terminal spring ends integrally engaged in the first blind bore of each rod. The second blind bore of each of the linear rods is adapted for accepting a wheel lug therein.

3 Claims, 1 Drawing Sheet

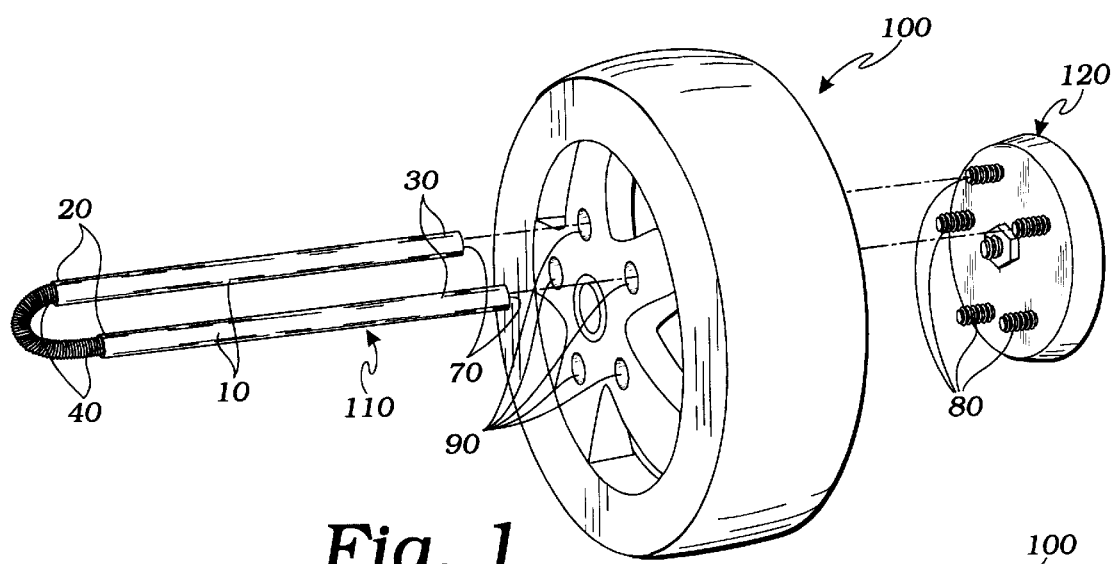
Fig. 1
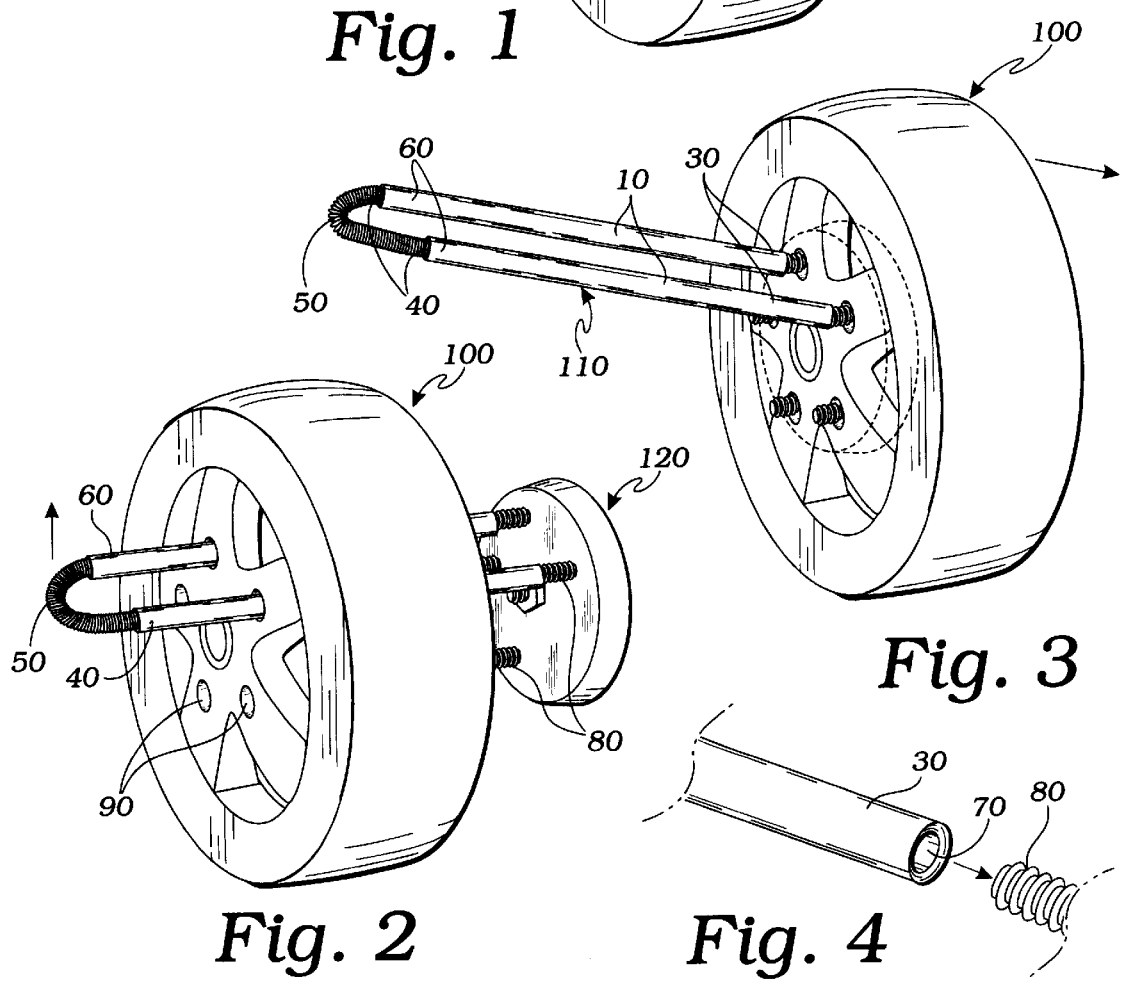
Fig. 2
Fig. 3
Fig. 4

WHEEL LIFTING ROD ASSEMBLY

BACKGROUND OF THE INVENTION

1. Field of the Invention

This invention relates generally to devices for lifting a replacement wheel assembly onto an automobile mounting plate and lug studs, and more particularly to a dual-rod device integral with a spring allowing for both lifting and alignment of a wheel assembly onto lug studs.

2. Description of Related Art

The following art defines the present state of this field:

Barkus et al. U.S. Pat. No. 5,479,692 describes devices and methods are provided for use in lifting an automobile wheel into an automobile body. An elongated member releaseably engages an automobile wheel and pivots on the body of the automobile as the elongated member is lifted to lift the automobile wheel into the body. In addition, devices and methods are provided for mounting an automobile wheel on an automobile wheel hub assembly and removing the same therefrom. An elongated member is placed within a central aperture of an automobile wheel and the elongated member is pivoted either on an outer surface of an axially central member of an automobile wheel hub assembly or on an inner wall of an axially central member thereof.

Barkus et al. U.S. Pat. No. 5,581,866 provides devices for use in lifting an automobile wheel into an automobile body. An elongated member releaseably engages an automobile wheel and pivots on the body of the automobile as the elongated member is lifted to lift the automobile wheel into the body. In addition, devices and methods are provided for mounting an automobile wheel on an automobile wheel hub assembly and removing the same therefrom. An elongated member is placed within a central aperture of an automobile wheel and the elongated member is pivoted either on an outer surface of an axially central member of an automobile wheel hub assembly or on an inner wall of an axially central member thereof.

Smith et. al. U.S. Pat. No. D343,997 shows the ornamental design for a tool for mounting a wheel on a vehicle, as shown and described.

Garcia et al. U.S. Pat. No. 4,602,415 describes a wheel mounting device, comprising a handle mounted centered and normal to one surface of a crossbar, cylindric arms extending, respectively from the opposite surface of the crossbar, terminating in undercut heads having, respectively diameters larger than those of the arms, and a roller frame detachably mounted to the crossbar for manipulating the position of the wheel relative to a hub.

Seifert et al. U.S. Pat. No. 5,897,171 describes an apparatus and methods for facilitating replacement of a vehicle wheel and eliminating the frustrations associated with the alignment of lug bolts with holes in the replacement wheel. The invention may be included in new vehicles or retrofitted by the owners of older vehicles. The apparatus comprises an elongated support member extending from a hub of a vehicle adjacent to lug bolts also extending from the hub or hub holes in the hub. The hub is rotated so that the support member is in the topmost position, and the replacement wheel is hung on the support member. Gravity insures that the holes in the wheel are aligned with the lug bolts so that it is easy to push laterally on the wheel to engage the lug bolts in the holes. The support member may include one lug bolt which is longer than the others or a dedicated guide pin attached to the hub. In another embodiment, one of the holes is enlarged, and a topmost lug bolt is elongated by slipping a guide tube over it after inserting the tube through the enlarged wheel hole. The tube can be included in a kit along with a machining tool for enlarging the hole. To further ease the task, the tube may be beveled at the end which slips onto the lug bolt and then used as a lever to lift the tire into place. The beveled end allows for easy positioning of the guide tube even when the guide tube is disposed at an angle to the lug bolt. The invention is readily adaptable to various vehicles.

Interdonato et al. U.S. Pat. No. 4,097,979 describes a guide tool to assist in mounting and dismounting an automobile wheel on the hub mounting studs therefor includes an elongated hollow tubular body internally threaded at the ends thereof with different diameter threads for threaded engagement with either of two different size wheel studs. The outer surface of the body is cylindrical and dimensioned to be received through the stud holes of the wheel for guiding the wheel onto and off of the studs without sliding engagement between the wheel and the stud threads. Diametrically opposed recesses in the outer surface of the body intermediate the ends thereof provide a seat for an end wrench or the like to facilitate mounting the guide tool on or removing it from a wheel stud.

Suggs, Sr. et. al. U.S. Pat. No. D347,981 shows the ornamental design for a tire lifting and handling tool, as shown.

Hebnes et al. U.S. Pat. No. 4,949,448 describes a wheel mounting tool for mounting a wheel having a plurality of mounting holes to a hub having a plurality of corresponding externally threaded mounting studs. The tool includes a socket portion with an internal thread for engaging a threaded stud of the hub, and an offset elongated handle portion pivotally attached to the socket portion. In use the tool can be threaded to a mounting stud of the hub, placed through a mounting hole of the wheel, and pivoted about the stud to lift and force the wheel onto the hub with all of the mounting holes of the wheel in alignment with all of the mounting studs of the hub.

Weitekamp et al. U.S. Pat. No. 5,022,133 describes a wheel mounting tool for a wheel assembly including a hub with a plurality of bolt studs and a wheel with bolt holes registerable with the bolt studs comprises an elongated, rigid straight shank with a cylindrical open-ended socket on at least one end. The socket has an inside cylindrical surface with a diameter larger than the diameter of the bolt studs and an outside cylindrical surface with a diameter smaller than the diameter of the bolt holes. In a preferred embodiment, a shallow internal thread extends circumferentially around the inside cylindrical surface adjacent the open mouth end of the socket. The inside diameter of the internal threads is larger than the outside diameter of the bolt studs enabling the socket to be assembled onto and removed from the bolt studs by relative axial movement. Alternatively, the internal threads may be substituted by a helical array of thread segments or internal protuberances having a pitch angle matching the pitch angle of the threads on the bolt studs. A further alternative is to provide an inner sleeve of indentable material inside the socket to resist relative axial movement between the socket and bolt stud during mounting of the wheel.

Kliskey et. al. U.S. Pat. No. D412,271 shows the ornamental design for a tire mount/demount bar, as shown and described.

Tarter et. al. U.S. Pat. No. 3,389,453 describes a rod-like tool having a threaded end for engagement with the threads in a brake drum or studs provided for securing an automobile wheel in place. A flexible joint is spaced a short distance from the end. The diameter of the tool is sufficiently small to pass through a bolt hole in the wheel. When an automobile wheel is to be installed, the threaded end is engaged with the drum and the rod passed through one of the holes in the wheel disk, the flexible joint bending downward when the wheel is on the ground. By lifting up on the outer end of the tool, the wheel slides into place with little manual effort. A slidable handle is used to hold the wheel in position while the lug studs or nuts are being installed.

Meyers, et. al. U.S. Pat. No. 1,494,269 describes a tool comprising a substantially elongated handle member, a bolt engaging member at one end of said handle, and means for setting up a loose connection between said handle and bolt engaging member.

Barkus et. al. WO 95/11779 describes devices for use in lifting an automobile wheel into an automobile body. An elongated member releaseably engages an automobile wheel and pivots on the body of the automobile as the elongated member is lifted to lift the automobile wheel into the body. In addition, devices are provided for mounting an automobile wheel on an automobile wheel hub assembly and removing the same therefrom. An elongated member is placed within a central aperture of an automobile wheel and the elongated member is pivoted either on an outer surface of an axially central member of an automobile wheel hub assembly or on an inner wall of an axially central member thereof.

The prior art teaches tire mounting devices, and by this we mean an automotive type tire mounted onto a wheel as an assembly, some with dual parallel connected handle rods designed to lift a wheel assembly onto lug studs as in the present invention, and some which allow the rod to bend at a joint using a helical spring secured inside the rod. However, the prior art does not teach two rods joined together by a flexible spring that enables the wheel assembly to be horizontally aligned on the lug studs at the same time it is mounted, and that also can be used on wheel assemblies of various sizes and lug stud configurations. The present invention fulfills these needs and provides further related advantages as described in the following summary.

SUMMARY OF THE INVENTION

The present invention teaches certain benefits in construction and use which give rise to the objectives described below.

The present invention provides an apparatus comprising a pair of smooth linear rods, each of the rods providing a first rod end and a second rod end, the first rod end of each of the rods having a first blind bore therein, and the second rod end of each of the rods having a second blind bore therein. A coiled spring is integrally engaged between the dual linear rods. The coiled spring provides a pair of opposing terminal spring ends, one of each of the terminal spring ends integrally engaged in the first blind bore of each rod. The second blind bore of each of the linear rods is adapted for accepting a wheel lug therein. The coiled spring integrally joined with the rods not only allows for the mounting of wheel assemblies with lug studs spaced apart at various intervals, but also enables the wheel assembly to be aligned on the lug studs at the same time it is mounted.

A primary objective of the present invention is to provide a wheel assembly mounting, lifting, and aligning apparatus having advantages not taught by the prior art.

Another objective is to provide an apparatus comprising a single assembly to prevent one part from becoming displaced from the other.

A further objective is to provide an apparatus which allows the wheel assembly to be aligned on two lug studs at the same time, therefore obviating the need for manual rotation of the wheel assembly.

A further objective is to provide an apparatus with a flexible rod spacing so that the apparatus can be used with various wheel assembly sizes and lug stud configurations.

A further objective is to provide an apparatus with rods having such a low coefficient of friction that the automotive wheel slides easily along the rods when the rods are appropriately angled toward the wheel assembly.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 1 is a perspective view of the preferred embodiment of the present invention in the direction of use relative to an automobile wheel assembly, wheel assembly mounting holes, and lug studs mounted on an automobile wheel assembly drum;

FIG. 2 is a perspective view of the apparatus, similar to that in FIG. 1, showing linear rods engaged with lug studs before the wheel assembly has slid down linear rods onto the studs;

FIG. 3 is a perspective view of the mounted wheel assembly, similar to that in FIG. 2, showing the apparatus angled slightly with the horizontal after the wheel assembly has slid along the rods onto the lug studs;

FIG. 4 is a perspective view of a second blind bore end of a linear rod and the direction it would be inserted over a lug stud.

DETAILED DESCRIPTION OF THE INVENTION

The above described drawing figures illustrate the invention, an apparatus comprising a pair of smooth linear rods 10, preferably constructed of a metal such as aluminum or steel with a hard coating such as anodizing or plating respectively, each of the rods providing a first rod end 20 and a second rod end 30. The first rod end 20 of each of the linear rods 10 includes a first blind bore 40. A flexible coil spring 50 provides a pair of opposing terminal spring ends 60, each of the terminal spring ends 60 integrally engaged in the first blind bore 40 of the respective linear rods 10. This is most appropriately accomplished by providing an internal thread within the first blind bore 40. The second rod end 30 of each of the linear rods 10 includes a second blind bore 70 sized so as to accept an automobile wheel lug stud 80 when the linear rod 10 is placed through mounting holes 90 of an automobile wheel 100. The second blind bore 70 reaches to a point inside the second rod end 30 at least equal to the length of the lug stud 80.

Inventively, the coiled spring 50, integrally connected with each of the linear rods 10, is of such length and flexibility as to enable the linear rods 10 to be placed in parallel, side-by-side alignment when they are inserted into the adjacent mounting holes 90 in the wheel 100.

Inventively, the linear rods 10 each have a hard smooth surface 110 of such low coefficient of friction so as to enable the wheel 100 to slide along the linear rods 10 towards a wheel hub 120 when the linear rods 10 are held at a low angle such as a 15 degree angle with the horizontal. 130. The wheel hub 120 is comprised of a circular mounting plate 140 on which the lug studs 80 are circularly arranged. Thus, with the wheel 100 resting on a ground surface, it is generally possible to position a bare automotive wheel 100 at a height such that an upper two wheel assembly lug studs 80 are slightly above a corresponding two lug holes in the wheel 100. Then, with the rods 10 of the present invention placed into said two holes 90 in the wheel 100, and with the second blind bores 70 placed into engagement with the two upper lug studs 80, the rods 10 may be lifted from their outer terminal ends so as to also lift the wheel, until the wheel starts to slide along the rods 10 toward the lug studs 80. When the wheel is resting against the wheel hub 120, the rods 10 may be pulled away from the wheel 100, leaving the wheel in a proper position to be held in place by lug nuts as is necessary in changing a wheel assembly.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus comprising:
    a pair of smooth linear rods, each of the rods providing a first rod end and a second rod end, the first rod end of each of the rods having a first blind bore therein, the second rod end of each of the rods having a second blind bore therein; and
    a coiled spring providing a pair of opposing terminal spring ends, one of each of the terminal spring ends integrally engaged in the first blind bore of each rod; the second blind bore of each of the linear rods adapted for accepting a wheel lug therein.

2. The apparatus of claim 1 wherein the linear rods are in parallel, side-by-side alignment with the second rod ends within a pair of adjacent mounting holes in an automobile wheel.

3. The apparatus of claim 2 wherein the linear rods each have a hard smooth surface of such coefficient of friction as to enable the automobile wheel to slide along the linear rods, by manual pressure when the linear rods are held approximately horizontally.

\* \* \* \* \*